(12) United States Patent
Doherty et al.

(10) Patent No.: US 8,509,962 B2
(45) Date of Patent: Aug. 13, 2013

(54) TIERED OPERATION OPTION SCANNING FOR WHEELCHAIR

(75) Inventors: John Doherty, Laconia, NH (US); Matthias Holenweg, Buren an der Aare (CH); Jill Kolczynski, Andover, MN (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

(21) Appl. No.: 13/538,255

(22) Filed: Jun. 29, 2012
(Under 37 CFR 1.47)

(65) Prior Publication Data

US 2013/0144458 A1      Jun. 6, 2013

Related U.S. Application Data

(63) Continuation of application No. 13/293,456, filed on Nov. 10, 2011, now abandoned.

(60) Provisional application No. 61/413,810, filed on Nov. 15, 2010.

(51) Int. Cl.
*G05D 1/00* (2006.01)

(52) U.S. Cl.
USPC .................. 701/1; 701/49; 180/167; 180/204; 180/271; 280/650

(58) Field of Classification Search
USPC .................. 701/1, 45, 49, 72; 180/68.5, 167, 180/204, 271; 280/650
See application file for complete search history.

(56) References Cited

U.S. PATENT DOCUMENTS

| | | | |
|---|---|---|---|
| 4,207,959 A * | 6/1980 | Youdin et al. | 180/167 |
| 8,315,770 B2 * | 11/2012 | Strothmann et al. | 701/72 |
| 2002/0088657 A1 * | 7/2002 | Brett et al. | 180/68.5 |
| 2004/0094936 A1 * | 5/2004 | Koerlin | 280/650 |
| 2008/0088110 A1 * | 4/2008 | Pham et al. | 280/250.1 |
| 2010/0138128 A1 * | 6/2010 | Strothmann et al. | 701/72 |

* cited by examiner

*Primary Examiner* — Gertrude Arthur Jeanglaude
(74) *Attorney, Agent, or Firm* — Woodcock Washburn LLP

(57) ABSTRACT

A wheelchair can include a control system that is configured to operate the wheelchair using an input device and a scanning device. The scanning device may be programmed to have a multi-tiered scan sequence. A first tier of the multi-tiered scan sequence may include at least a first operation option that is configured to operate a specific function of the wheelchair. A second tier of the multi-tiered scan sequence may include at least a second operation option that is also configured to operate a specific function of the wheelchair. The second operation option is generally selected less frequently than the first operation option included in the first tier.

23 Claims, 6 Drawing Sheets

TIERED OPERATION OPTION SCANNING FOR WHEELCHAIR

CROSS REFERENCE TO RELATED APPLICATIONS

This application is a continuation of U.S. patent application Ser. No. 13/293,456 filed Nov. 10, 2011 which claims the benefit of U.S. Provisional Application Ser. No. 61/413,810 filed Nov. 15, 2010, the disclosures of which are hereby incorporated by reference in their entirety herein.

BACKGROUND

Some people with severe physical disabilities or serious neurological diseases that result in muscle weakness such as Lou Gehrig's disease (ALS) may have only one or two specific movements or muscles that they can readily control. Input devices have been developed to allow such people to control everything from a motorized wheelchair to a computer program. For example, besides hand operated input devices, there are input devices that can be activated by an eyelid blinking, or by puffing on a straw-like object. Using these input devices along with a scanning device, an individual may be able to select from a plurality of operation options. For example, the scanning device will scan through possible drive operation options one at a time, and indicates or identifies the nature of each choice to the user by highlighting it on a screen, by an audible tone, or by some other indicia appropriate to the user's abilities. The operation is highlighted for a predetermined amount of time, after which the scanning device automatically moves to the next operation option and highlights the next available operation option. After the desired operation option has been identified, the user may select the operation option by triggering the input device. In this way, a single switch input device may be used to operate a wheelchair.

Typical wheelchairs may have a four operation option scanning sequence (i.e. "Forward," "Reverse," "Left," and "Right," etc.) or even an eight operation option scanning sequence. When the scanning device reaches the chosen option the individual presses the input device and the chair drives in the direction chosen. Depending on the programmed scan timing and the number of available operation options (i.e. four or eight), the delay between the desire to place an input and availability of the input can be significant.

SUMMARY

In accordance with an embodiment, a method of operating a wheelchair includes scanning through a plurality of primary operation options of a first tier of operation options on a scanning device such that each primary operation option is sequentially highlighted for a predetermined amount of time. At least some of the primary operation options are associated with a respective wheelchair function. The scanning device may also scan through a plurality of secondary operation options of a second tier of operation options such that each secondary operation option is sequentially highlighted for a predetermined amount of time. At least some of the secondary operation options are associated with a respective wheelchair function. A highlighted one of the primary operation options or one of the secondary operation options may be selected with an input device. A wheelchair may then be caused to perform the wheelchair function associated with the selected primary operation option or secondary operation option.

By using such a system, the more commonly used operation options are contained within the first or top tier and the less frequently desired operation options are contained within the second or lower tier. By not allowing the selection of all options during each cycle, the more common options are available more frequently therefore decreasing the amount of time that it takes to choose those operation options.

In accordance with another embodiment, a method of operating a wheelchair includes the step of selecting one of a first mode of wheelchair operation and a second mode of wheelchair operation and then canning through a first group of primary operation options when the first mode has been selected such that each primary operation option of the first group of primary operation options is sequentially highlighted for a predetermined amount of time or scanning through a second group of primary operation options when the second mode has been selected such that each primary operation of the second group of primary operation options is sequentially highlighted for a predetermined amount of time. At least some of the primary operation options of the first and second groups are associated with respective wheelchair functions, and the first group of primary operation options is different than the second group of primary operation options. A highlighted one of the primary operation options may be selected to thereby cause a wheelchair to perform the wheelchair function associated with the selected primary operation option.

In accordance with another embodiment, a wheelchair includes a frame, a seat supported by the frame, a pair of drive wheels rotatably coupled to the frame, and a drive operatively coupled to each drive wheel. The seat can be configured to support an infirmed occupant. The wheelchair also includes a control system configured to operate the drives. The control system includes a scanning device and an input device operatively coupled to the scanning device. The scanning device is configured to sequentially highlight respective primary operation options of a first tier of operation options for a predetermined amount of time, and to optionally sequentially highlight respective secondary operation options of a second tier of operation options for a predetermined amount of time. Upon selection of one of the respective primary operation options or one of the respective secondary operation options by the input device causes the wheelchair to move in a desired direction.

DETAILED DESCRIPTION

Figure 1:
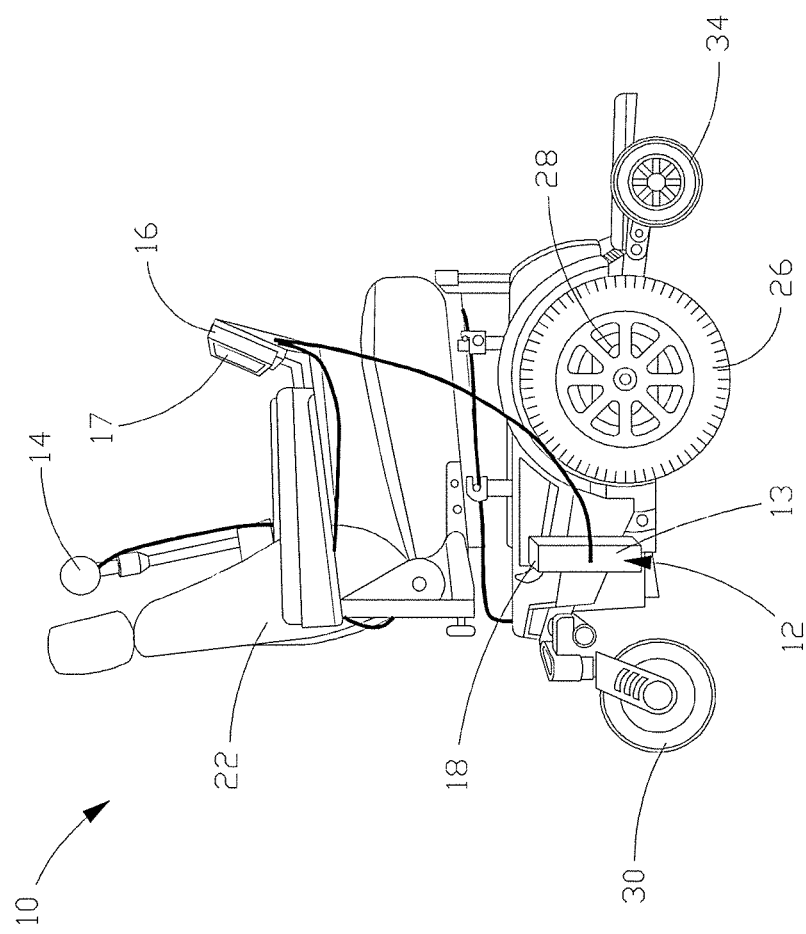
FIG. 1 is a side elevation view of a motorized wheelchair that is configured to be operated using an operating system that includes an input device and a scanning device.
Figure 2:
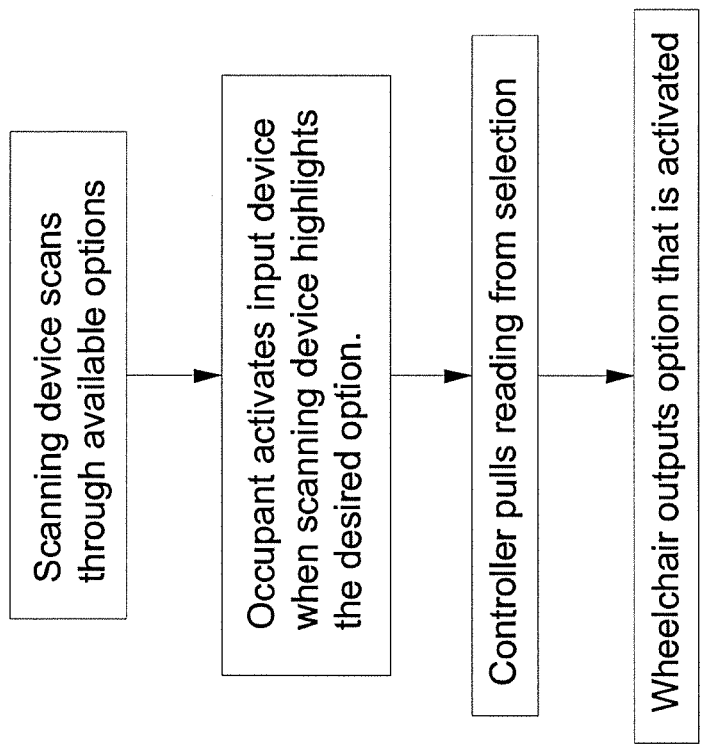
FIG. 2 is a flow chart of operation of the operating system of FIG. 1.

As shown in FIGS. 1 and 2, a personal mobility vehicle such as a wheelchair 10 includes an operating system 12 that is configured to control at least some of the functions of the wheelchair 10. The control system 12 includes a controller 13, an input device 14 coupled to or otherwise in communication with the controller 13, and a scanning device 16 coupled to or otherwise in communication with both the controller 13 and the input device 14. The operation system 12 or at least the scanning device 16 is configured to scan through a plurality of operation options, such as drive forward, left turn, right turn, etc. until a desired option has been reached or otherwise highlighted. Once the desired operation option has been reached or has otherwise been highlighted by the scanning device 16, an occupant will activate the input device 14 to thereby select the operation option and cause the wheelchair 10 to perform the selected operation option (i.e. "drive forward"). While automatically and sequentially navigating through the operation options, the scanning device 16 will highlight each operation option for a preset or predetermined amount of time, such as between about 500 milliseconds and about 20 seconds. For example, the scanning device 16 may first highlight "drive forward" for 500 milliseconds and if "drive forward" is not selected the scanning device 16 will highlight the subsequent operation option, i.e. "left turn" for 500 milliseconds. The scanning device 16 will continue navigating through the operation options in this manner until the desired operation option is highlighted and then selected.

In the illustrated embodiment, the wheelchair 10 is a mid-wheel drive wheelchair. As shown, the wheelchair 10 includes a frame 18, and a seat 22 that is supported by the frame 18 and configured to support an infirmed occupant. The wheelchair 10 further includes a pair of drive wheels 26 that are rotatably coupled to the frame 18, a pair of rear caster wheels 30 that are rotatably coupled to the frame 18 rearward to the drive wheels 26, and a pair of front anti-tip wheels 34 that extend from the frame 18 forward of the drive wheels 26. The wheelchair 10 further includes a pair of drives 28 that are each operatively coupled to one of the drive wheels 26. The drives 28 can be powered by a power source such as batteries. While the wheelchair 10 is illustrated as being a mid-wheel drive wheelchair, it should be appreciated, that the wheelchair 10 is not limited to being a mid-wheel drive wheelchair and that other configurations are envisioned. For example, the wheelchair 10 may be a rear-wheel drive wheelchair or a front-wheel drive wheelchair.

As shown in FIG. 1, the input device 14 can be a single switch that is coupled to the frame 18 such that the input device 14 is positioned proximate to where an occupant of the wheelchair's cheek would be located. In the illustrated embodiment, the single switch input device 14 is a paddle switch that is pressed or otherwise contacted by the occupant in order for the occupant to select a highlighted operation option on the scanning device 16. It should be appreciated that the single switch input device 14 is not limited to paddle switches and that other input devices 14 may be used as desired. For example, the input device 14 may include devices that are activated by blinking an eyelid, sipping or puffing on a straw-like object, touching an object, placing a finger or hand over an object, breaking a beam of light, moving one's eyes, or moving an object with one's lips. Further, the input device 14 may be positioned anywhere on the wheelchair 10 and may be coupled to the scanning device 16 either directly or indirectly, depending on the type of input device 14 used, the wheelchair setup, and the needs or abilities of the wheelchair occupant. For example, if an occupant is only able to move a toe, the input device 14 may be disposed on the wheelchair frame 22 proximate to the occupant's toe.

The input device 14 can be coupled to the controller 13 either directly or indirectly. For example, in the illustrated embodiment, the input device 14 is directly coupled to the controller 13 via a cable 36. Moreover, it should be appreciated that the input device 14 can be coupled to the controller 13 via a wireless connection. Therefore in such embodiments, the input device 14 and the controller 13 may not be physically connected via the cable 36.

As shown in FIGS. 1 and 2, the scanning device 16 is configured to display or otherwise signal to the occupant the plurality of operation options that may be selected by the occupant to operate the wheelchair. In the illustrated embodiment, the scanning device 16 includes a sensory device 17 that signals to the occupant the different operation options. In the illustrated embodiment, the sensory device 17 is a monitor that visually displays the different operation options to the occupant of the wheelchair 10. While the scanning device 16 is illustrated as including a monitor, it should be appreciated that the scanning device 16 may signal to the occupant the different operation options using other sensory devices 17, as desired. For example, the scanning device 16 may include speakers that audibly signal the different operation options to the occupant. In operation, the scanning device 16 will individually and sequentially highlight (audibly, visually, etc.) each operation option for a predetermined amount of time until the desired operation option is highlighted and selected by the occupant of the wheelchair 10. For example, the scanning device 16 can be configured to individually and sequentially highlight each operation option for a predetermined amount of time that is between about 500 milliseconds and about 20 seconds, preferably between 500 milliseconds and about 10 milliseconds, and even more preferably between 500 milliseconds and about 5 seconds. It should be appreciated, however, that the scanning device 16 can be configured to individually and sequentially highlight each operation option for any preset or predetermined amount of time, as desired.

As shown in FIG. 1, the controller 13 is coupled to the wheelchair frame 18 and is configured to control at least one, such as a plurality of functions of the wheelchair 10. While the controller 13 is illustrated as being a single device, it should be appreciated, that the controller 13 is not limited to being housed in a single module or being coupled solely to the wheelchair frame 18 as illustrated. Therefore, the scanning device 16 and the input device 14 can be coupled to multiple controllers 13. For example, one controller 13 may be configured to operate the drives of the wheelchair 10, while another controller 13 may be configured to operate functions on a seating system of the wheelchair 10. In such an embodiment, both controllers 13 could be operated through the scanner 16 and the input device 14. It should also be appreciated that the controller 13 and the scanning device 16 can be a single device that scans through the operation options and then causes the wheelchair to perform the function associated with the selected operation option.

Now referring to FIG. 2, the control system 12 is configured to allow an occupant to operate the wheelchair 10 using the input device 14. As shown, the scanning device 16 will scan through the available operation options until a desired operation option is highlighted. Once highlighted, the occupant will activate the input device 14 to select the desired operation option. The controller 13 (or series of controllers 13) will then instruct or otherwise cause the wheelchair 10 to output or otherwise perform the selected operation option. Depending on the occupant, the wheelchair 10, and even the environment, any number of operation options may be provided to the occupant.

Figure 3:
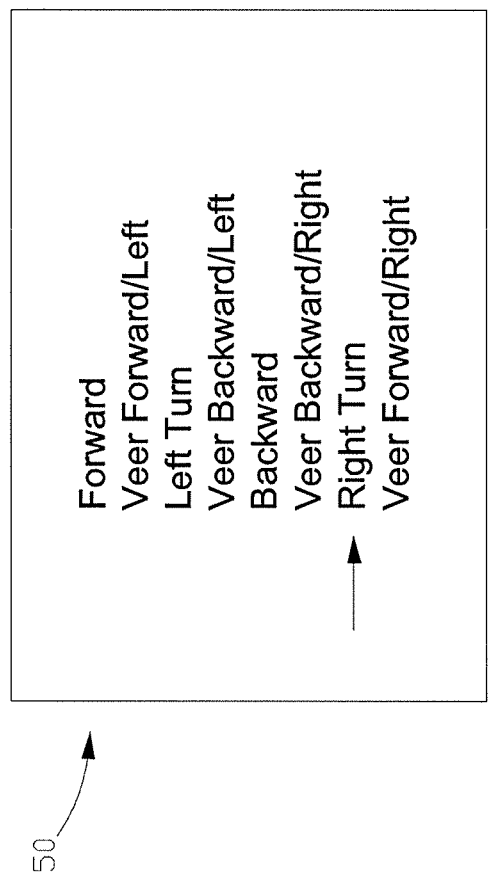
FIG. 3 is a schematic view of a configuration of the control system where a single tiered sequence of operation options is displayed to the occupant of the wheelchair by the scanning device, the scan sequence showing all drive operation options in a single tiered sequence.

As shown in FIG. 3, the control system 12 may be configured to display a plurality of operation options as a single scan sequence 50. In this mode, the scanning device 16 will navigate through the plurality of operation options of the single scan sequence 50 sequentially and highlight each operation option for a predetermined amount of time until the scanning device 16 has reached the desired option. As shown in FIG. 2, if the single scan sequence 50 includes eight operation options (i.e. Forward, Veer Forward/Left, Left Turn, Veer Backward/Left, Backward, Veer Backward/Right, Right Turn, and Veer Forward/Right), and the control system 12 is programmed to highlight each operation option for five seconds it may take the scanning device 16 thirty-five seconds to highlight the operation option "Veer Forward/Right" if that is the desired operation option for the occupant. While the single scan sequence 50 may be simple, as one could imagine it may be frustrating for the occupant to wait this amount of time to reach his or her desired operation option.

Figure 4:
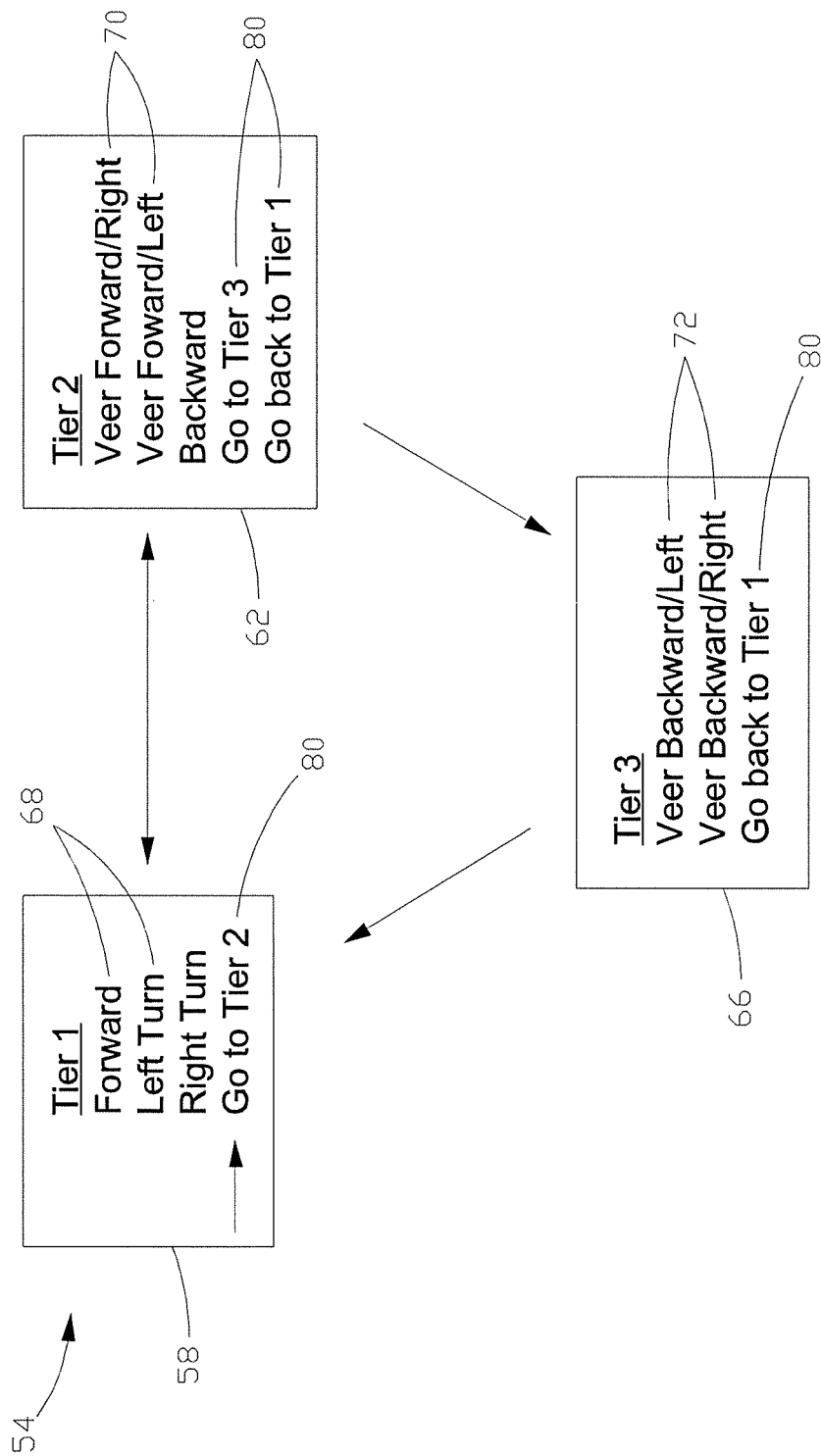
FIG. 4 is a schematic view of a configuration of the control system where a multi-tiered scan sequence of operation options is displayed to the occupant of the wheelchair by the scanning device, the scan sequence showing the operation options in different tiers according to certain criteria.

As shown in FIG. 4, the control system 12 may also be programmed or otherwise configured to have multi-tiered scan sequence 54. In such a configuration, the operation options may be separated into different tiers based on frequency of operation. That is, each available operation option during a scan sequence has a different frequency of operation in may be placed into different tiers depending on the function being operated, the occupant's preferences, and the situation in which they are being used. For example, driving in a forward direction is typically more common than driving in reverse. To allow the common operation options to appear more frequently, the common or primary operation options may be displayed in a first tier of a multi-tiered scan sequence.

As shown in FIG. 4, the multi-tiered scan sequence 54 can include a first tier of operation options 58, a second tier of operation options 62, and a third tier of operation options 66. The first tier of operation options 58 can include at least two, such as a plurality of primary operation options 68, the second tier of operation options 62 can include at least two such as a plurality of secondary operation options 70, and the third tier of operation options 66 can include at least two such as a plurality of tertiary operation options 72. At least some of the primary operation options 68, at least some of the secondary operation options 70, and at least some of the tertiary operation options 72 are associated with a respective wheelchair function (i.e. "Forward," "Left Turn," "Right Turn," "Veer Forward/Right," "Veer Forward/Left," "Backward," "Veer Backward/Left," and "Veer Backward/Right"). It should be appreciated, however, that the respective wheelchair functions may also include other wheelchair functions, such as those that move the seat, for example. As shown in FIG. 4, at least one of the primary operation options 68, at least one of the secondary operation options 70, and at least one of the tertiary operation options 72 can be a new tier option 80, such as "Go to Tier 2," "Go to Tier 3," "or "Go back to Tier 1," for example. Therefore, if the occupant desires a different operation option that is not found in the first tier of operation options 58, he or she may then select the new tier option 80 which will then display a different tier of the multi-tiered sequence 54.

Typically, though not required, the first tier of operation options 58 will contain the more frequently used operation options, the second tier of operation options 62 will contain the less frequently used operation options, and so on. While the first, second, and third tiers 58, 62, and 66 include operation options that direct the occupant to the other tiers it should be appreciated that the control system 12 may be configured such that the multi-tiered sequence 54 may automatically go to a subsequent tier after a predetermined number of cycles through a current tier. Moreover, it should be appreciated that the multi-tiered scan sequence 54 can include any number of tiers, as desired, and each tier can include any number of operation options, as desired.

In operation, the scanning device 16 will scan through the plurality of primary operation options 68 of the first tier of operation options 58 such that each respective primary operation option 68 is sequentially highlighted for the predetermined amount of time. The scanning device 16 will continue to loop through the respective primary operation options 68 until the new tier option 80 of the primary operation options 68 is selected, at which point the scanning device 16 will begin scanning through the plurality of secondary operation options 70 of the second tier of operation options 62 such that each respective secondary operation option 70 is sequentially highlighted for the predetermined amount of time. As with the first tier 58, the scanning device 16 will continue to loop through the respective secondary operation options 70 until one of the new tier options 80 of the second tier of operation options is selected. The same process will occur for the third tier of operation options 66. That is, if requested, the scanning device 16 will scan through the plurality of tertiary operation options 72 of the third tier of operation options 66 such that each respective tertiary operation option 72 is sequentially highlighted for the predetermined amount of time. As with the first and second tiers 58 and 62, the scanning device 16 will continue to loop through the respective tertiary operation options 72 until one of the new tier options 80 of the third tier of operation options 66 is selected.

Once the scanning device 16 has highlighted the desired operation option, whether it be in the first tier 58, second tier 62, or third tier 66, the highlighted operation option can be selected with the input device 14. The controller 13 will then cause the wheelchair to perform the wheelchair function associated with the selected operation option.

By configuring the control system to have a multi-tiered scan sequence 54, the occupant will be able to select their desired option at a faster rate. For example, using the scan sequence 54, the more commonly used operation options are placed in the first tier of operation options 58 and the less frequently accessed operation options are placed in the second and third tiers of operation options 62 and 66. By not allowing the selection of all operation options during each cycle within a tier, the more common operation options are available more frequently therefore decreasing the amount of time that it takes to choose those options. Furthermore, the multi-tiered sequence 54 may be programmed such that the primary operation options 68 in the first tier of operation options 58 are each highlighted for a greater amount of time than the secondary and tertiary operation options 70 and 72 of the second and third tiers of operation options 62 and 66.

Figure 5:
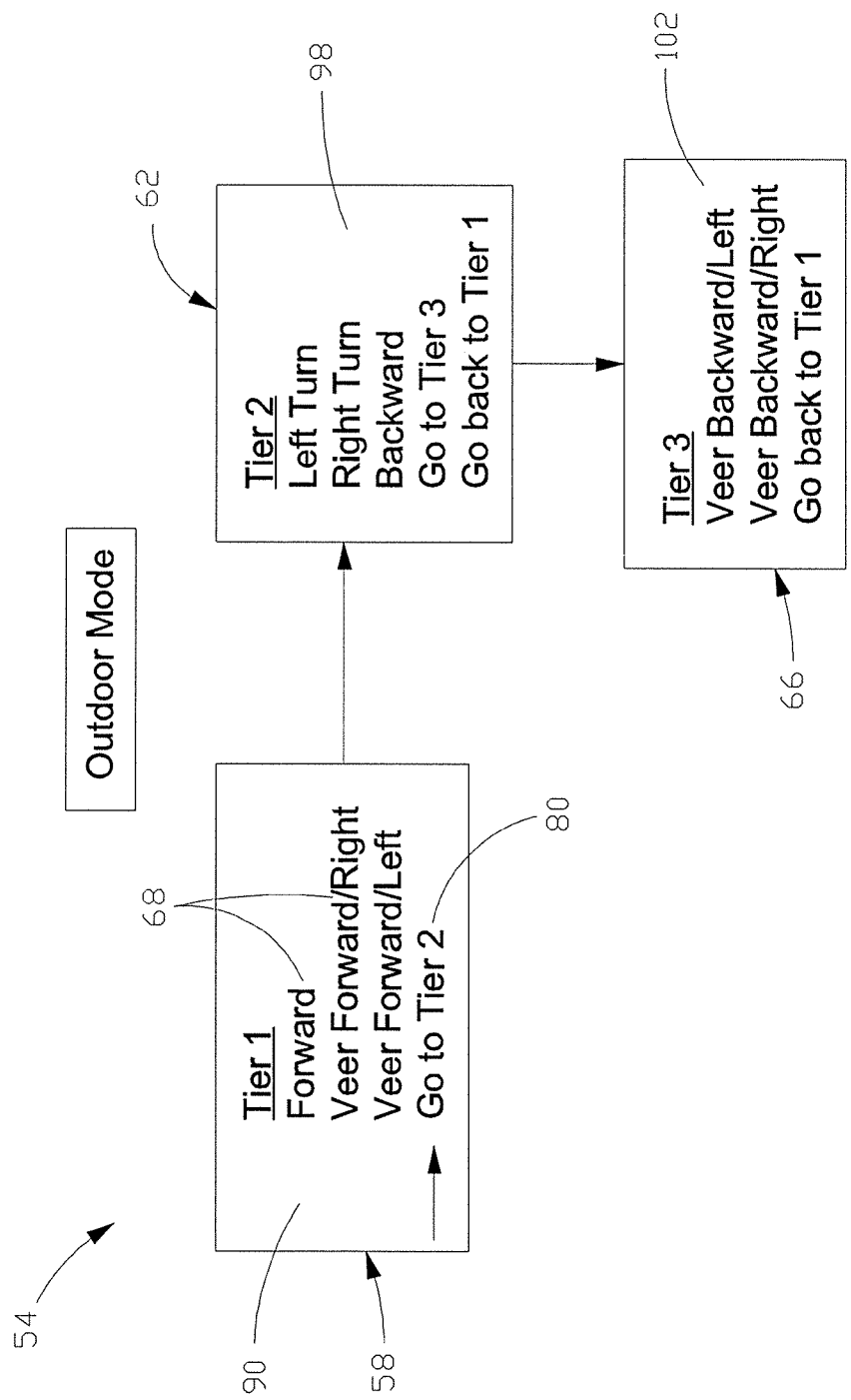
FIG. 5 is a schematic view of a multi-tiered scan sequence for a first mode of wheelchair operation.
Figure 6:
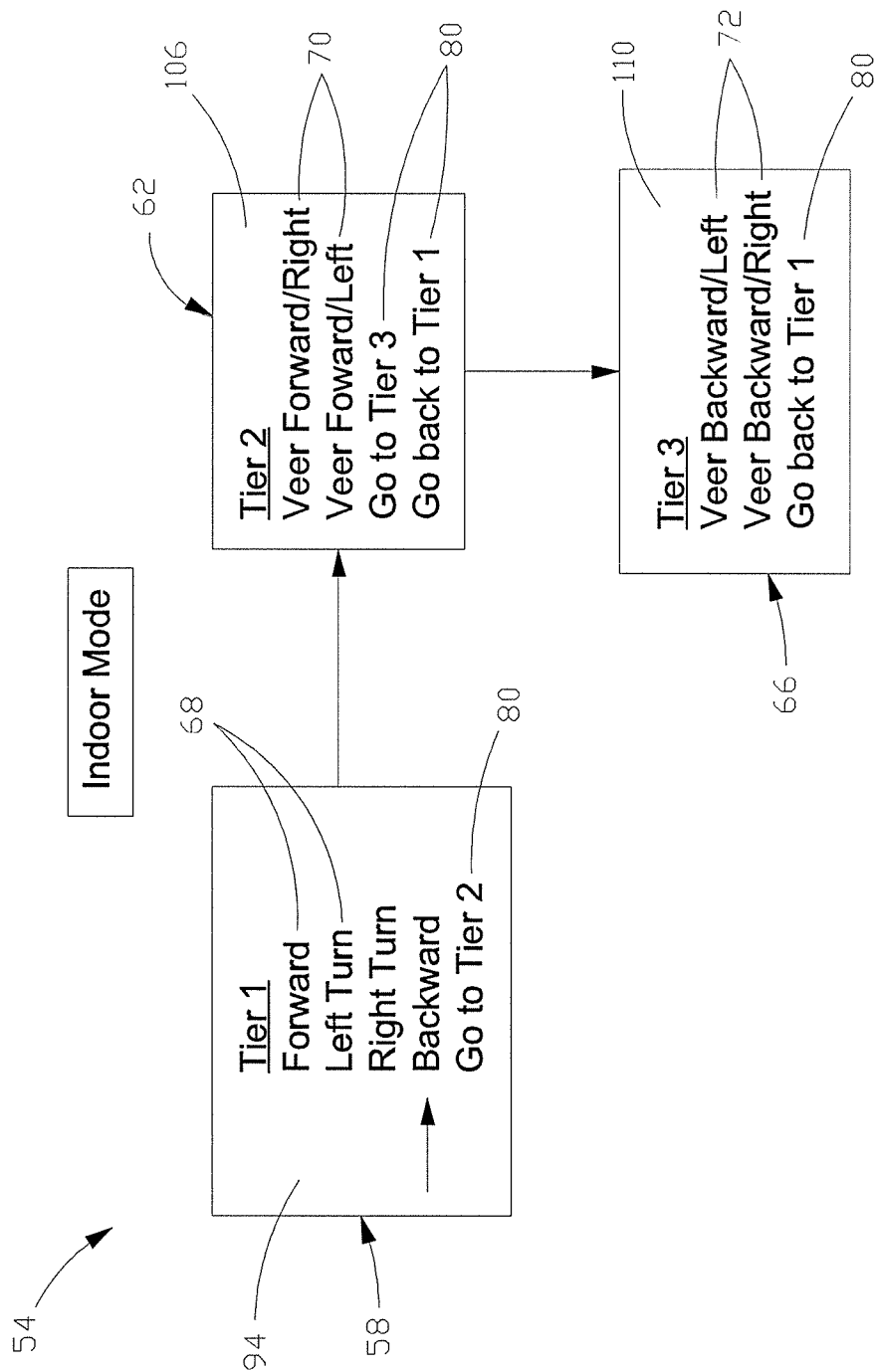
FIG. 6 is a schematic view of a multi-tiered scan sequence for a second mode of wheelchair operation, the second mode being different than the first mode.

As shown in FIGS. 5 and 6, the control system 12 may also be programmed or otherwise configured to operate in different modes of wheelchair operation. By having different modes, the multi-tiered scanning sequence 54 may be programmed to have different groups of operation options for the first, second and third tiers 58, 62, 66 depending on the mode of wheelchair operation that the control system 12 is operating. For example, if the wheelchair 10 is in a first mode of wheelchair operation, such as an outdoor mode as shown in FIG. 5, the first tier of operation options 58 can include a first group of primary operation options 90, and if the wheelchair 10 is in a second mode of wheelchair operation, such as an indoor mode as shown in FIG. 6, the first tier of operation options 58 can include a second group of primary operation options 94. As shown, the first group of primary operation options 90 is different than the second group of primary operation options 94. That is, at least one of the respective primary operation options 68 of the first group of primary operation options 90 is associated with a wheelchair function that is not associated with a primary operation option 68 of the second group of primary operation options 94. It should be appreciated, however, that the first group of primary operation options 90 may be different from the second group of primary operation options 94 by ordering the primary operation options 68 of the first group primary operation options 90 in a different sequence then that of the second group of primary operation options 94.

As shown in FIGS. 5 and 6, the second tier of operation options 62 and the third tier of operation options 66 may each also have different groups of operation options depending on which mode the control system 12 is operating in. For example, if the wheelchair 10 is in the first mode of wheelchair operation, as shown in FIG. 5, the second and third tier of operation options 62 and 66 can include a first group of secondary operation options 98 and a first group of tertiary operation options 102, respectively. If the wheelchair 10 is in the second mode of wheelchair operation, as shown in FIG. 6, the second and third tier of operation options 62 and 66 can include a second group of secondary operation options 106 and a second group of tertiary operation options 110, respectively. As shown, the first group of secondary and tertiary operation options 98 and 102 are different than the second group of secondary and tertiary operation options 106 and 110, respectively.

In operation, the first mode of wheelchair operation or the second mode of wheelchair operation may be selected depending on what mode is desired. When in the first mode of wheelchair operation, the scanning device 16 will scan through the first group of primary operation options 90 of the first tier of operation options 58 such that each respective primary operation option 68 is sequentially highlighted for the predetermined amount of time. The scanning device 16 will continue to loop through the respective primary operation options 68 until the new tier option 80 of the primary operation options 68 is selected, at which point the scanning device 16 will begin scanning through the first group of secondary operation options 98 of the second tier of operation options 62 such that each respective secondary operation option 70 is sequentially highlighted for the predetermined amount of time. As with the first tier, the scanning device 16 will continue to loop through the respective secondary operation options 70 until one of the new tier options 80 of the second tier of operation options is selected. The same process will occur for the third tier of operation options 66. That is, if requested, the scanning device 16 will scan through the first group of tertiary operation options 106 of the third tier of operation options 66 such that each respective tertiary operation option 72 is sequentially highlighted for the predetermined amount of time. As with the first and second tiers, the scanning device 16 will continue to loop through the respective tertiary operation options 72 until one of the new tier options 80 of the third tier of operation options 66 is selected.

When in the second mode of wheelchair operation, the scanning device 16 will scan through the second group of primary operation options 94 of the first tier of operation options 58 such that each respective primary operation option 68 is sequentially highlighted for the predetermined amount of time. The scanning device 16 will continue to loop through the respective primary operation options 68 until the new tier option 80 of the primary operation options 68 is selected, at which point the scanning device 16 will begin scanning through the second group of secondary operation options 102 of the second tier of operation options 62 such that each respective secondary operation option 70 is sequentially highlighted for the predetermined amount of time. As with the first tier, the scanning device 16 will continue to loop through the respective secondary operation options 70 until one of the new tier options 80 of the second tier of operation options is selected. The same process will occur for the third tier of operation options 66. That is, if requested, the scanning device 16 will scan through the second group of tertiary operation options 110 of the third tier of operation options 66 such that each respective tertiary operation option 72 is sequentially highlighted for the predetermined amount of time. As with the first and second tiers, the scanning device 16 will continue to loop through the respective tertiary operation options 72 until one of the new tier options 80 of the third tier of operation options 66 is selected.

Regardless of whether the first mode or second mode of wheelchair operation has been selected, once the scanning device 16 has highlighted the desired operation option, whether it be in the first tier 58, second tier 62, or third tier 66, the highlighted operation option can be selected with the input device 14. The controller 13 will then cause the wheelchair to perform the wheelchair function associated with the selected operation option.

It should be appreciated that the first and second modes of wheelchair operation may include other configurations. For example, one of the modes of wheelchair operation may be a seat adjustment mode. Moreover, it should be appreciated, that the control system 12 may be configured to have any number of modes of wheelchair operation as desired.

The control system 12 may be preprogrammed or otherwise configured by the manufacturer and/or may be customizable to the occupant. For example, each occupant may desire different operation options more frequently, and therefore, the control system 12 should be programmed or otherwise customized to each occupant. Once the control system 12 has been programmed, the sequence, such as the multi-tiered sequence 54 may be locked such that the occupant will not be able to make changes to the multi-tiered sequence 54. Furthermore, the operation options available, the scanning sequences, the tier options, and the number of cycles of repetition in each tier can be customized to each occupant to allow for optimal functionality.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Further, several advantages have been described that flow from the structure and methods; the present invention is not limited to structure and methods that encompass any or all of these advantages. Those skilled in personal mobility technology, having the benefit of the teachings of this specification, may effect numerous modifications to the invention as described herein, and changes can be made without departing from the scope and spirit of the invention as defined by the appended claims. For example, while the multi-tiered sequence 54 is described as having three tiers it should be understood that the sequence 54 may include any number of tiers.

What is claimed:

1. A method of operating a wheelchair, the method comprising:
scanning through a plurality of primary operation options of a first tier of operation options on a scanning device such that each primary operation option is sequentially highlighted for a predetermined amount of time, wherein at least some of the primary operation options are associated with a respective wheelchair function, and at least one of the primary operation options is a new tier option;
scanning through a plurality of secondary operation options of a second tier of operation options on the scanning device when the new tier option of the first tier of operation options has been selected such that each secondary operation option is sequentially highlighted for a predetermined amount of time, wherein at least some of the secondary operation options are associated with a respective wheelchair function;
receiving input that a highlighted one of the primary operation options or one of the secondary operation options is to be selected; and
causing a wheelchair to perform the wheelchair function associated with the selected primary operation option or secondary operation option.

2. The method of claim 1, wherein the step of scanning through the plurality of primary operation options includes sequentially highlighting each primary operation option for a predetermined amount of time that is between about 500 milliseconds and about 10 seconds.

3. The method of claim 1, wherein the step of scanning through the plurality of primary operation options of the first tier of operation options continues to loop through the primary operation options until the new tier option is to be selected.

4. The method of claim 1, further comprising the step of scanning through a plurality of tertiary operation options of a third tier of operation options upon selection of a new tier option of the second tier of operation options.

5. The method of claim 1, wherein the wheelchair is caused to move forward upon the step of receiving input from the user that the highlighted one of the primary operation options or one of the secondary operation options is to be selected.

6. The method of claim 1, further comprising the step of receiving input from the user that one of a first mode of wheelchair operation and a second mode of wheelchair operation is to be selected, wherein the first tier of operation options includes a first group of primary operation options when the first mode is selected, and the first tier of operation options includes a second group of primary operation options when the second mode is selected, the first group of primary operation options being different than the second group of primary operation options.

7. The method of claim 6, wherein the first mode of wheelchair operation corresponds to indoor use of the wheelchair, and the second mode of wheelchair operation corresponds to outdoor use of the wheelchair.

8. The method of claim 1, further comprising visually displaying the plurality of primary operation options and the plurality of secondary operation options on a monitor as the scanning device scans through the plurality of primary operation options and through the plurality of secondary operation options, respectively.

9. The method of claim 1, wherein the step of receiving input from a user that the highlighted one of the primary operation options or one of the secondary operation options is to be selected includes receiving input from a paddle switch.

10. A method of operating a wheelchair, the method comprising:
receiving input from a user that one of a first mode of wheelchair operation and a second mode of wheelchair operation is to be selected;
scanning through a first group of primary operation options when the first mode of wheelchair operation has been selected such that each primary operation option of the first group of primary operation options is sequentially highlighted for a predetermined amount of time;
scanning through a second group of primary operation options when the second mode of wheelchair operation has been selected such that each primary operation of the second group of primary operation options is sequentially highlighted for a predetermined amount of time, wherein at least some of the primary operation options of the first and second groups are associated with respective wheelchair functions, and the first group of primary operation options is different than the second group of primary operation options;
receiving input that a highlighted one of the primary operation options is to be selected;
causing a wheelchair to perform the wheelchair function associated with the selected primary operation option.

11. The method of claim 10, further comprising the step of scanning through a first group of secondary operation options when the first mode of wheelchair operation has been selected and after each primary operation option of the first group of primary operation options has been sequentially highlighted for the predetermined amount of time.

12. The method of claim 11, further comprising the step of scanning through a second group of secondary operation options when the second mode of wheelchair operation has been selected and after each primary operation option of the second group of primary operation options has been sequentially highlighted for the predetermined amount of time.

13. The method of claim 12, wherein at least one of the primary operation options of the first group of primary operation options is a new tier option that when selected causes the scanning device to scan through the first group of secondary operation options, and wherein at least one of the primary operation options of the second group of primary operation options is a new tier option that when selected causes the scanning device to scan through the second group of secondary operation options.

14. The method of claim 13, wherein the step of scanning through the first group of primary operation options continues to loop through the primary operation options of the first group of primary operation options until the new tier option of the first group of primary operation options is selected, and the step of scanning through the second group of primary operation options continues to loop through the primary operation options of the second group of primary operation options until the new tier option of the second group of primary operation options is selected.

15. The method of claim 10, wherein the wheelchair is caused to move forward upon the step of receiving input from the user that the highlighted one of the primary operation options is to be selected.

16. The method of claim 10, further comprising the step of visually displaying the first group of primary operation options on a monitor as the scanning device scans through the first group of primary operation options.

17. A wheelchair comprising:
a frame;
a seat supported by the frame, the seat configured to support an infirmed occupant;
a pair of drive wheels rotatably coupled to the frame;
a drive operatively coupled to each drive wheel; and
a control system configured to operate the drives, the control system including a scanning device and an input device operatively coupled to the scanning device, the scanning device is configured to sequentially highlight respective primary operation options of a first tier of operation options for a predetermined amount of time, and to optionally sequentially highlight respective secondary operation options of a second tier of operation options for a predetermined amount of time upon selection of a new tier option of the first tier of operation options,
wherein upon selection of one of the respective primary operation options or one of the respective secondary operation options causes the wheelchair to move in a desired direction.

18. The wheelchair of claim 17, wherein the control system further includes a controller that is operatively coupled to both the scanning device and the input device.

19. The wheelchair of claim 17, wherein the scanning device includes a monitor that displays the highlighted primary operation options and secondary operation options.

20. The wheelchair of claim 17, wherein the control system is configured to have a first mode of wheelchair operation and a second mode of wheelchair operation.

21. The wheelchair of claim 20, wherein the first tier of operation options includes a first group of primary operation options when the control system is in the first mode of wheelchair operation, and the first tier of operation options includes a second group of primary operation options when the control system is in the second mode of wheelchair operation, the first group of primary operation options being different than the second group of primary operation options.

22. The wheelchair of claim 17, wherein the scanning device is configured to continuously sequentially highlight the respective primary operation options of the first tier of operation options unless the scanner device is instructed to sequentially highlight the respective secondary operation options of the second tier of operation options.

23. The wheelchair of claim 17, wherein the input device is a paddle switch.

* * * * *